United States Patent
Ebigt et al.

(10) Patent No.: US 8,584,484 B2
(45) Date of Patent: Nov. 19, 2013

(54) AIRCRAFT COOLING SYSTEM EVAPORATOR ARRANGEMENT FOR TWO MUTUALLY INDEPENDENT COOLANT CIRCUITS

(75) Inventors: Wolfgang Ebigt, Hamburg (DE); Wilson Willy Casas Noriega, Hamburg (DE)

(73) Assignee: Airbus Operations GmbH (DE)

( * ) Notice: Subject to any disclaimer, the term of this patent is extended or adjusted under 35 U.S.C. 154(b) by 633 days.

(21) Appl. No.: 12/675,278

(22) PCT Filed: Sep. 1, 2008

(86) PCT No.: PCT/EP2008/007128
§ 371 (c)(1), (2), (4) Date: Nov. 29, 2010

(87) PCT Pub. No.: WO2009/030448
PCT Pub. Date: Mar. 12, 2009

(65) Prior Publication Data
US 2011/0107782 A1 May 12, 2011

Related U.S. Application Data

(60) Provisional application No. 60/969,227, filed on Aug. 31, 2007.

(30) Foreign Application Priority Data

Aug. 31, 2007 (DE) .......................... 10 2007 041 281

(51) Int. Cl.
*F25B 7/00* (2006.01)

(52) U.S. Cl.
USPC .... 62/335; 62/79; 62/113; 62/175; 62/DIG. 5

(58) Field of Classification Search
USPC .................... 62/79, 113, 175, 335, DIG. 5
See application file for complete search history.

(56) References Cited

U.S. PATENT DOCUMENTS 5,131,237 A * 7/1992 Valbjorn ...................... 62/175
(Continued)

FOREIGN PATENT DOCUMENTS

| DE | 1601023 A | 7/1970 |
| EP | 0091006 A | 10/1983 |
| EP | 0354037 A2 | 2/1990 |
| EP | 1780479 A1 | 5/2007 |

(Continued)

OTHER PUBLICATIONS

PCT International Search Report for PCT/EP2008/007128 completed by the EP Searching Authority on Nov. 18, 2008.

*Primary Examiner* — Cheryl J Tyler
*Assistant Examiner* — Jonathan Bradford
(74) *Attorney, Agent, or Firm* — Barnes & Thornburg, LLP

(57) ABSTRACT

An aircraft cooling system evaporator arrangement has at least two mutually independent coolant circuits, at least two evaporation devices arranged to be hydraulically parallel for enabling an exchange of heat between the coolant and a refrigerant, at least two supply lines for supplying refrigerant to the evaporation devices, and at least two discharge lines for discharging refrigerant from the evaporation devices. A different one of the evaporation devices, a different one of the supply lines and a different one of the discharge lines are assigned to each of the coolant circuits, and the supply lines are hydraulically separate from each other as are the discharge lines. At least one refrigerant sensor monitors a refrigerant state of each of the discharge lines and an expansion valve is driven in accordance with the refrigerant sensors to control streams of refrigerant through the supply lines.

19 Claims, 2 Drawing Sheets

(56) References Cited

U.S. PATENT DOCUMENTS

| | | |
|---|---|---|
| 6,381,974 B1 | 5/2002 | Hwang et al. |
| 6,880,353 B1 | 4/2005 | Yap et al. |
| 6,898,945 B1 | 5/2005 | Grove |
| 2005/0150240 A1* | 7/2005 | Doi et al. .................. 62/225 |
| 2006/0288713 A1 | 12/2006 | Knight et al. |

FOREIGN PATENT DOCUMENTS

| | | |
|---|---|---|
| EP | 1806547 A | 7/2007 |
| EP | 10 2006 006 731 A1 | 8/2007 |
| WO | WO 2005/030579 A1 | 4/2005 |
| WO | WO 2005063568 A1 * | 7/2005 |

* cited by examiner

AIRCRAFT COOLING SYSTEM EVAPORATOR ARRANGEMENT FOR TWO MUTUALLY INDEPENDENT COOLANT CIRCUITS

CROSS-REFERENCE TO RELATED APPLICATIONS

This application is a U.S. national counterpart application of international application serial No. PCT/EP2008/007128 filed Aug. 31, 2007, which claims priority to U.S. Provisional Patent Application No. 60/969,227 filed Aug. 31, 2007 and to German Patent Application No. 102007041281.0 filed Aug. 31, 2007.

FIELD OF THE INVENTION

The present invention relates to an aircraft cooling system evaporator arrangement with at least two mutually independent coolant circuits.

BACKGROUND

In the following description and in the appended claims, by the term 'coolant' a medium is designated that, when used in a cooling system, transports cold or heat substantially without change of phase between sites of differing temperature (though short-term local changes of phase in the coolant medium may occur). This holds, of course, for the operating conditions for which the system in question is designed, since a change of phase can always be brought about under sufficiently extreme conditions. Coolants are generally present in the liquid state. Water mixed with alcohol or with another antifreeze agent may, for example, be employed as coolant.

SUMMARY

The term 'refrigerant', on the other hand, designates in the present case a medium that changes its state of aggregation in the course of the transport of cold or the transport of heat. As a rule, gaseous refrigerant is cooled down in a condenser and, in the process, passes over into the liquid state. By exchange of heat with a medium to be cooled, for example the coolant, the liquid refrigerant can evaporate and cool down the medium to be cooled by extracting therefrom the energy (enthalpy of evaporation) necessary for evaporating the refrigerant. This definition too relates to the conditions for which the system in which the refrigerant is being used is designed. Frequently $CO_2$ or hydrocarbon compounds find application as a refrigerant.

Modern commercial aircraft are, for the most part, equipped with cooling systems, in order, for example, to make cooling functions available for galleys. The cooling systems should not be confused with the air-conditioning systems which are likewise present for regulating the air temperature and the atmospheric condition in the cabin and are, as a general rule, independent of these systems. In particular, larger aircraft frequently have more than one load with a cooling requirement; for example, several galleys may be present.

Hitherto this plurality of loads has frequently been supplied in decentralised manner. Each load was provided with a separate cooling unit or refrigerating machine assigned to it. Such a cooling unit is, as a rule, supplied in flight with cool ram air from a ram-air inlet. The ram air flows through a condenser and thereby cools a refrigerant. Via a customary refrigerant circuit the refrigerant is supplied to an evaporator in which a coolant is cooled by exchange of heat with the refrigerant. Therefore in conventional systems a plurality of different refrigerating machines or evaporators are necessary, which are matched to the relatively low cooling requirement of the individual loads. In conventional systems of such a type, waste heat is released into the fuselage of the aircraft, placing an additional burden on the air-conditioning system.

In modern commercial aircraft, however, use is increasingly being made of centralised aircraft cooling units. The various loads are supplied with cooled coolant, whereby in each instance one or more centralised evaporation devices are provided for cooling the coolant for several loads. In systems of such a type, the refrigerant with which the coolant is cooled is cooled by ram air, just as described above. However, in centralised systems fewer but larger ram-air inlets are provided, in order to ensure sufficient cooling.

As a rule, in centralised cooling systems of such a type two independent circuits for coolants of two refrigerating machines are cooled with refrigerant circuits, in order to ensure redundancy. Frequently in this case the evaporators are arranged one after the other in series in a refrigerant circuit.

WO 2005/030579 A1 discloses a cooling system for aircraft galleys, in which various components of a cooling system are used jointly by another cooling system.

DE 1 601 023 A discloses a forced-flow evaporator for compression refrigerating systems, in which the wetting of the surface of a channel wall with refrigerant liquid is increased. The document further discloses arranging a temperature probe downstream of an evaporator, in order to control an expansion valve which is arranged upstream of the evaporator.

Documents U.S. Pat. Nos. 6,880,353 B1, 6,381,974 B1 and EP 1 780 479 A1 also deal with cooling appliances.

Given intense (cooling) loading of the coolant circuits, in particular given variably intense loading of the coolant circuits, the problem may arise that one of the coolant circuits requires so much cooling that the refrigerant has already passed over into the gas phase in such large proportions that a sufficient cooling of the following coolant circuit is no longer possible. It may even happen that an intensely loaded first coolant circuit completely evaporates the refrigerant in a first evaporator, so that virtually no cooling of the second circuit is possible any longer. A measurement and control of the stream of refrigerant at various places with several sensors and valves, intended to help prevent such states, is elaborate, costly and complex.

There is therefore a requirement for an aircraft cooling system evaporator arrangement that circumvents these problems and at the same time is simple and inexpensive in its manufacture.

OUTLINE OF THE INVENTION

With a view to solving the aforementioned problem, the present invention provides an aircraft cooling system evaporator arrangement, with at least two mutually independent circuits for coolant, at least two evaporation devices arranged to be hydraulically parallel for enabling an exchange of heat between the coolant and a refrigerant, at least two supply lines for supplying refrigerant to the evaporation devices, and at least two discharge lines for discharging refrigerant from the evaporation devices. In this connection, one of the evaporation devices, one of the supply lines and one of the discharge lines are assigned to each coolant circuit. Supply lines and discharge lines assigned to various coolant circuits are arranged to be hydraulically separate in each instance. Moreover, at least one refrigerant sensor for monitoring a refrigerant state is assigned to each of the discharge lines. In accordance with the invention, the evaporator arrangement includes, in addition, an expansion valve which for the purpose of controlling streams of refrigerant through the supply lines is designed to be driven in accordance with the refrigerant sensors. There may be provision to arrange the supply lines and discharge lines assigned to different coolant circuits to be hydraulically parallel in each instance.

The aircraft cooling system evaporator arrangement according to the invention requires only a single expansion valve in order to control several streams of refrigerant. As a result, the evaporator arrangement is particularly inexpensive and low-maintenance. Nevertheless, requisite streams of refrigerant can be adjusted reliably, so that the coolant circuits can each be cooled sufficiently. This enables, in particular, an independence of the refrigerant supply of the various coolant circuits, to the effect that no circuit consumes so much refrigerant that another circuit can no longer be sufficiently cooled.

The refrigerant sensors preferably take the form of temperature sensors. By the temperature of the refrigerant downstream of the evaporation devices being determined, inferences as to the state of the refrigerant can be made reliably; in particular, it is possible to establish whether the refrigerant has evaporated completely. In alternative embodiments the refrigerant sensors may also have been designed as pressure sensors or density sensors. Other types of sensors are also possible, so long as they permit an excessive vapour content or gas content in the refrigerant downstream of the evaporation device to be reliably established.

In a further development of the invention a main refrigerant feeder is furthermore provided, from which the refrigerant supply lines branch out. In particular, there may be provision that the expansion valve is arranged in the main refrigerant feeder. In this way, the expansion valve can be simply employed for controlling the streams of refrigerant through the supply lines, since it is located at a central position with respect to the streams of refrigerant.

The branching of the main refrigerant feeder is preferably effected into refrigerant supply lines of identical cross-section. As a result, a quantitatively balanced stream of refrigerant through the supply lines is guaranteed.

In advantageous manner the discharge lines are merged downstream of the at least one evaporation device to form a main refrigerant drain. This facilitates the conducting of the refrigerant in a closed refrigerant circuit.

In a further embodiment there is provision that the evaporator arrangement includes a control device which is connected to the refrigerant sensors and to the expansion valve. This enables an easy drive of the expansion valve in accordance with the refrigerant sensors by means of the control device. Complex control programs for the expansion valve may also have been realised in the control device.

In particular, there may be provision that the control device is adapted to determine, on the basis of the refrigerant states determined by the refrigerant sensors, a coolant circuit that is under a greatest cooling load. In advantageous manner the control device is further adapted to drive the expansion valve in accordance with that refrigerant sensor which appertains to the refrigerant discharge line that is assigned to the coolant circuit under greatest cooling load. Consequently the expansion valve can be driven in such a manner that the maximally required cooling load can be delivered by the refrigerant. In particular, the coolant subjected to the greatest cooling load is prevented from being only insufficiently supplied with refrigerant.

The degree of saturation of liquid refrigerant in the discharge lines may preferentially serve for determining the coolant circuit subjected to the greatest cooling load. It is to be assumed that the coolant circuit subjected to the greatest cooling load requires liquid refrigerant the most in order to guarantee the requisite cooling. The discharge line with the lowest content of liquid refrigerant (as determined by means of the refrigerant sensors) is therefore assigned to the coolant circuit with the greatest cooling load.

In a further development of the invention there may be provision that the expansion valve is adapted to be driven electrically. This enables a particularly well-controlled drive and reduces the number of moving parts. Hence the reliability of the drive of the expansion valve and the service life of the system are increased.

There may also be provision that the refrigerant sensors are adapted to emit electrical sensor signals. In this connection it is expedient, in particular, to design the control device as an electronic control device that is adapted to receive electrical sensor signals from the refrigerant sensors and adapted to drive the expansion valve in accordance with the sensor signals. Electrical systems of such a type can be designed more reliably and with lower weight than, for example, mechanical systems having a similar function.

In a preferred embodiment of the invention the evaporation devices are integrally formed with one another. This means that the evaporation devices are realised jointly in one component. As a result, the cooling of the coolant in the coolant circuits can be performed in space-saving manner at one location.

According to another aspect, the present invention relates to a process for operating a cooling system with an evaporator arrangement, as described above, the process including the steps of monitoring refrigerant states in discharge lines by means of refrigerant sensors, and of driving, in accordance with the refrigerant sensors, an expansion valve for controlling streams of refrigerant through refrigerant supply lines.

In this connection there may also be provision to determine, on the basis of the monitored refrigerant states in the refrigerant discharge lines, the coolant circuit which is subjected to the greatest cooling load. The expansion valve is then driven in accordance with that refrigerant sensor which monitors the refrigerant state of the refrigerant discharge line assigned to the coolant circuit subjected to the greatest cooling load.

The present invention also encompasses a cooling system of an aircraft that includes an evaporator arrangement as described above. In addition, the invention encompasses an aircraft that includes such a cooling system or an evaporator arrangement described above.

DETAILED DESCRIPTION OF THE FIGURES

Figure 1:
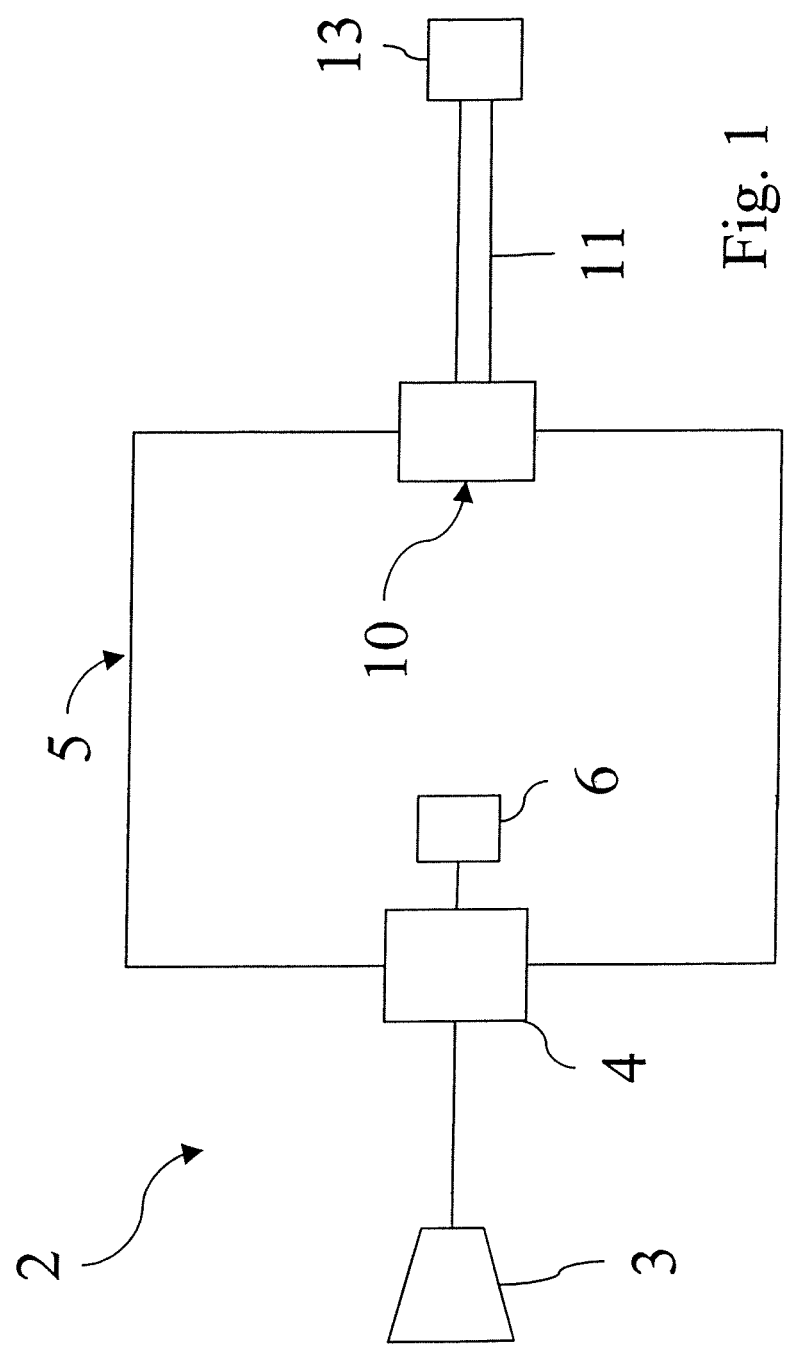
FIG. 1 shows an aircraft cooling system schematically.

In FIG. 1 an aircraft cooling system 2 is represented schematically. The aircraft cooling system 2 has a ram-air inlet 3, through which cold air from the external environment of the aircraft is supplied. This cold air is conducted to a condenser 4 which is part of a refrigerant circuit 5. Via an air outlet 6 the ram air can be discharged into the external environment of the aircraft after it has performed its cooling function.

The refrigerant circuit 5 further exhibits an evaporator 10. In the refrigerant circuit 5 a refrigerant is conducted which in operation can assume two phases, ordinarily liquid and gaseous. Further customary components of the refrigerant circuit—such as compressor, filter, etc.—are not shown in this simplified representation, in order to obtain clarity of the Figure; a person skilled in the art will add components of such a type as needed.

The evaporator 10 is, in addition, linked to a circuit 11 for a coolant. The coolant circuit 11 brings a coolant to several loads denoted overall as 13, for example refrigerators of galleys. The precise dimensioning and the course of the coolant circuit 11 are given by the requirements and arrangement of the loads of a particular aircraft.

For the sake of simplicity, only one coolant circuit 11 is represented here; as a rule, however, two or more coolant circuits are present which are linked to the evaporator 10. These several coolant circuits then supply various groups of loads. As a result, a redundancy arises, so that a cooling capacity can still be made available in the event of failure of a circuit.

In operation, incoming cold ram air (which at customary altitudes has a temperature of approximately −55° C.) cools down gaseous refrigerant in the condenser 4, so that the refrigerant condenses. On the other side of the refrigerant circuit 5 the refrigerant in the evaporator 10 is caused to exchange heat with the coolant in the coolant circuit 11. The refrigerant evaporates and draws the energy of evaporation needed for this from the coolant, which is cooled down as a result. The coolant is then supplied to the loads 13 via the coolant circuit 11.

Figure 2:
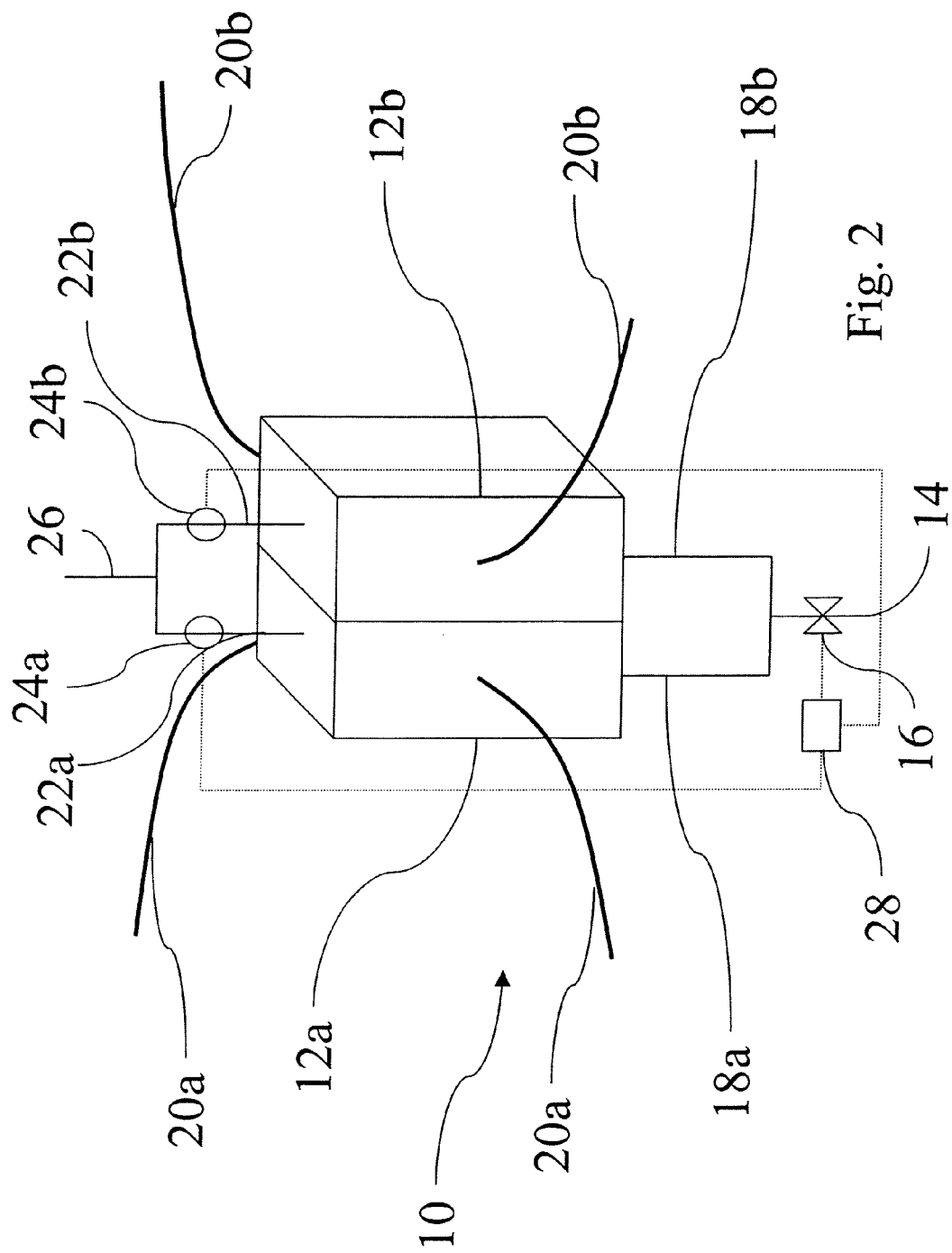
FIG. 2 shows an evaporator arrangement according to the invention.

In FIG. 2 an evaporator arrangement 10 according to the invention is represented. In this embodiment the evaporator arrangement 10 includes an evaporator which consists of two evaporation devices 12a, 12b which are integrally formed with one another but hydraulically separate. Any conventional suitable evaporator can be used by way of evaporator, for example a plate-type evaporator. The hydraulic separation can be established, for example, by inserting a separating plate into a large evaporator, so that evaporation devices 12a, 12b arranged to be hydraulically parallel are available in one component. The precise structural design of the evaporator 10 or of the evaporation devices 12a, 12b is determined by the requirements of the aircraft for which they are being constructed.

The evaporation devices 12a, 12b are connected in known manner to coolant circuits 20a, 20b. The latter supply coolant which is to be cooled down in the evaporation devices 12a, 12b to the evaporation devices 12a, 12b. Furthermore, the evaporator arrangement includes a main refrigerant feeder 14 in which an expansion valve 16 is fitted. The main refrigerant feeder 14 branches into two refrigerant supply lines 18a, 18b which respectively supply refrigerant to the evaporation device 12a and 12b. In the evaporation devices 12a, 12b, refrigerant and coolant are caused to exchange heat. In the process, a more or less large fraction of the refrigerant evaporates.

Via refrigerant discharge lines 22a, 22b the refrigerant is discharged from the evaporator. Provided in the refrigerant discharge lines 22a, 22b are refrigerant sensors 24a, 24b which monitor the state of the refrigerant. In this embodiment the refrigerant sensors 24a, 24b take the form of temperature probes which monitor the temperature of the refrigerant. The refrigerant sensors 24a, 24b make electrical sensor signals available.

Downstream of the refrigerant sensors 24a, 24b in each instance the refrigerant discharge lines 22a, 22b combine to form a main refrigerant drain 26. Not shown in FIG. 2 is the complete refrigerant circuit, in which the main refrigerant feeder 14 and the main refrigerant drain 26 are connected to one another in such a manner that a closed refrigerant circuit arises in which the refrigerant supply lines 18a, 18b and the refrigerant discharge lines 22a, 22b are arranged to be hydraulically parallel in each instance. The lines 18a, 18b and 22a, 22b are accordingly hydraulically separate in each instance. Furthermore, additional components which are not shown—such as, for example, a condenser, a compressor and/or a filter—may be provided in the refrigerant circuit.

The refrigerant sensors 24a, 24b are connected via electrical lines (represented in dotted manner in FIG. 2) to a control device 28. The latter is in turn electrically connected to the expansion valve 16 and can drive the latter in accordance with the sensors 24a, 24b. The control device 28 may also be integrally formed with the expansion valve 16.

In operation there is provision that the refrigerant sensors 24a, 24b monitor the state of the refrigerant leaving the evaporation devices 12a, 12b, and transmit sensor signals to the control device 28. The temperature of the refrigerant serves as a yardstick for its degree of saturation with refrigerant in liquid phase. If the temperature is above a critical value, which depends on the precise conditions of the cooling system and on the coolant being used, the proportion of liquid coolant is too low or even no longer present. The critical temperature can be established for each system as needed.

If one of the sensors 24a, 24b reports too high a temperature, which points to too intense evaporation of the refrigerant in the pertinent evaporation device 12a, 12b (in particular by reason of a high cooling load of the coolant circuit), the control device 28 controls the expansion valve 16 in such a manner that the stream of refrigerant through the expansion valve 16 is increased. In this embodiment, in the course of the evaluation as to whether the expansion valve is to be opened further or is to be closed the control device 28 is directed by the refrigerant sensor 24a, 24b which is arranged in that discharge line 22a, 22b which is assigned to the coolant circuit with the highest cooling load. In this connection the discharge line 22a, 22b in which the proportion of liquid refrigerant is lowest (in this embodiment, that in which the temperature of the refrigerant is highest) is assumed to be that discharge line 22a, 22b which is assigned to the coolant circuit 20a, 20b with the highest cooling load. In other embodiments other types of sensors can be used, which conform to a different relationship between the parameter measured by them and the degree of saturation of the refrigerant.

As a result of increasing the flow of refrigerant through the expansion valve 16, increased streams of refrigerant in the refrigerant supply lines 18a, 18b and through the evaporation devices 12a, 12b arise. The drive in this case can be effected in a small, fixed opening step in which the expansion valve 16 is opened further only by such a small fixed step. Should other sensor measurements show that still not enough refrigerant is being made available, the control device 28 brings about a more extensive opening of the expansion valve 16. This is carried out until such time as the state of the refrigerant downstream of the evaporation devices 12a, 12b is sufficiently saturated with liquid refrigerant, in order to ensure that sufficient cooling is available for both coolant circuits 20a, 20b.

It is, of course, also possible to assign defined opening states of the expansion valve 16 to defined refrigerant states of the more intensely loaded branch of the discharge lines 22a, 22b. The control device 28 then always drives the expansion valve 16 in a way such as the relevant refrigerant state requires. By virtue of the increased stream of refrigerant, the refrigerant is prevented from evaporating completely without achieving a sufficient cooling effect.

If both sensors 24a, 24b indicate that the refrigerant is not being evaporated substantially, the control device 28 can drive the expansion valve 16 in such a manner that the stream of refrigerant through the valve 16 diminishes. This results in a diminished flow of refrigerant through the refrigerant supply lines 18a, 18b. The closing of the expansion valve 16 can also take place in small steps, with subsequent examination as to whether the state of the refrigerant in the more intensely loaded branch has attained the desired state, and with possible readjusting in a manner analogous to the procedure described above. The control device is preferentially designed to control the stream of refrigerant or, to be more exact, the expansion valve 16 in such a way that the requisite cooling capacity of the most intensely loaded coolant circuit 20a, 20b is made available under the most favourable operating conditions for the cooling unit.

The arrangement that has been described ensures that enough refrigerant flows through each evaporation device 12a, 12b, in order to supply the coolant circuits sufficiently with cooling. The present invention is not restricted to the exemplary embodiment described above but may be realised in various variations. There may, for example, be provision to arrange more than two coolant circuits and an appropriate number of evaporation devices as well as refrigerant sensors.

What is claimed is:

1. Aircraft cooling system evaporator arrangement, comprising:
   at least two mutually independent coolant circuits each carrying a coolant;
   at least two evaporation devices arranged to be hydraulically parallel to and hydraulically separate from each other for enabling an exchange of heat between the coolant in each of the at least two coolant circuits and a refrigerant;
   at least two supply lines for supplying refrigerant to the evaporation devices;
   at least two discharge lines for discharging refrigerant from the evaporation devices;
   a different one of the at least two evaporation devices, a different one of the at least two supply lines and a different one of the at least two discharge lines being assigned to each of the at least two coolant circuits;
   the supply lines and discharge lines assigned to various coolant circuits being arranged to be hydraulically separate in each instance;
   furthermore at least one refrigerant sensor for monitoring a refrigerant state being assigned to each of the discharge lines;
   and the evaporator arrangement further including an expansion valve which for the purpose of controlling streams of refrigerant through the supply lines is designed to be driven in accordance with the refrigerant sensors.

2. Evaporator arrangement according to claim 1, wherein the refrigerant sensors are temperature sensors.

3. Evaporator arrangement according to claim 1, wherein the refrigerant sensors are pressure sensors.

4. Evaporator arrangement according to claim 1, wherein the refrigerant sensors are density sensors.

5. Evaporator arrangement according to claim 1, wherein furthermore a main refrigerant feeder is provided, from which the refrigerant supply lines branch out.

6. Evaporator arrangement according to claim 5, wherein the expansion valve is arranged in the main refrigerant feeder.

7. Evaporator arrangement according to claim 5, wherein the branching of the main refrigerant feeder is effected into refrigerant supply lines of identical cross-section.

8. Evaporator arrangement according to claim 1, wherein the discharge lines merge downstream of the at least two evaporation devices to form a main refrigerant drain.

9. Evaporator arrangement according to claim 1, wherein the evaporator arrangement further includes a control device which is connected to the refrigerant sensors and to the expansion valve.

10. Evaporator arrangement according to claim 9, wherein the control device is adapted to determine, on the basis of the refrigerant states determined by the refrigerant sensors, a coolant circuit that is subjected to a greatest cooling load.

11. Evaporator arrangement according to claim 10, wherein the control device is adapted to drive the expansion valve in accordance with that refrigerant sensor which is assigned to the refrigerant discharge line that is assigned to the coolant circuit subjected to the greatest cooling load.

12. Evaporator arrangement according to claim 1, wherein the expansion valve is adapted to be driven electrically.

13. Evaporator arrangement according to claim 1, wherein the refrigerant sensors are adapted to emit electrical sensor signals.

14. Evaporator arrangement according to claim 9, wherein the control device is adapted to receive electrical sensor signals from the refrigerant sensors and to drive the expansion valve electrically in accordance with the sensor signals.

15. Evaporator arrangement according to claim 1, wherein the evaporation devices are integrally formed with one another.

16. Process for operating a cooling system with an evaporator arrangement according to claim 1, the process including the following steps:
   monitoring refrigerant states in each of the at least two discharge lines by monitoring signals produced by the refrigerant sensors; and
   driving the expansion valve in accordance with the signals produced by the refrigerant sensors for the purpose of controlling streams of refrigerant through the at least two supply lines.

17. Process according to claim 16, the process further including the following steps:
   determining, on the basis of the monitored refrigerant states in each of the at least two refrigerant discharge lines, the one of the two coolant circuits that is subjected to a greatest cooling load; and
   driving the expansion valve in accordance with the signals produced by that refrigerant sensor which monitors the refrigerant state in the discharge line assigned to the one of the two coolant circuits that is subjected to the greatest cooling load.

18. Cooling system of an aircraft including an evaporator arrangement according to claim 1.

19. Aircraft including a cooling system according to claim 18.

* * * * *